Aug. 9, 1960
J. E. BURKAM
2,948,155
STABILIZING GYRO
Filed July 17, 1956
4 Sheets-Sheet 1
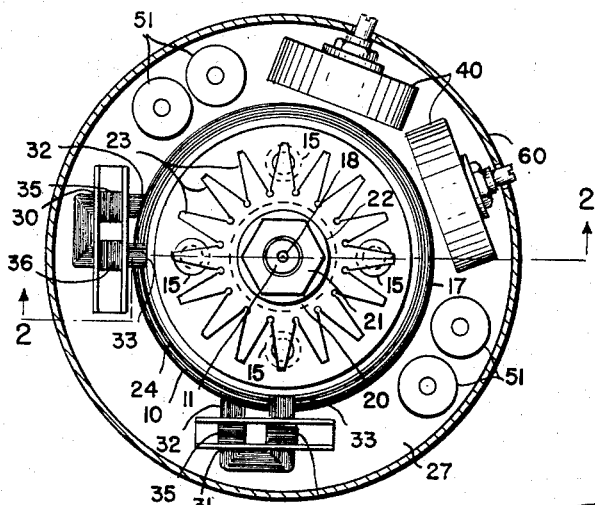
FIG. 1.
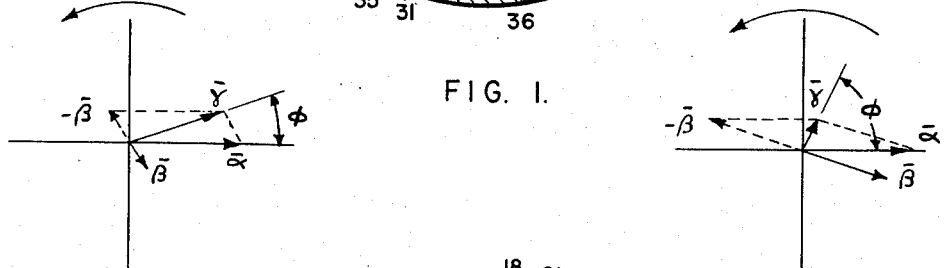
FIG. 6.
FIG. 7.
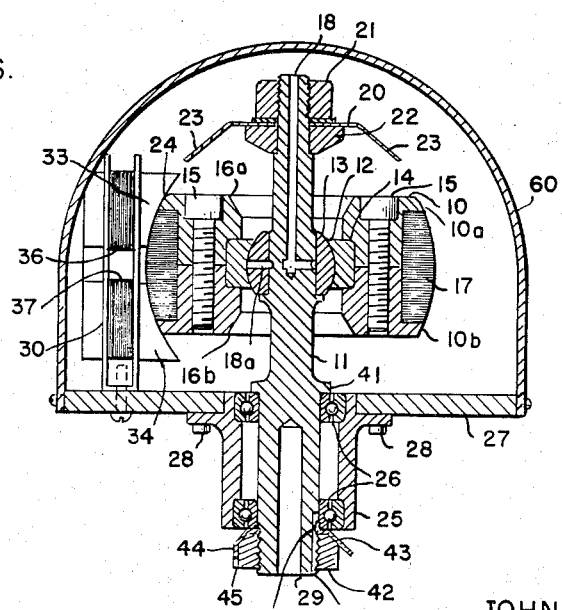
FIG. 2.
*INVENTOR.*
JOHN E. BURKAM
BY
Sidney W Frick
ATTORNEY Aug. 9, 1960      J. E. BURKAM      2,948,155
STABILIZING GYRO Filed July 17, 1956      4 Sheets-Sheet 3

*INVENTOR.*
JOHN E. BURKAM
BY
*Sidney W Frick*
ATTORNEY

Aug. 9, 1960 J. E. BURKAM 2,948,155
STABILIZING GYRO
Filed July 17, 1956 4 Sheets-Sheet 4

INVENTOR.
JOHN E. BURKAM
BY
*Sidney W Frink*
ATTORNEY

United States Patent Office 2,948,155
Patented Aug. 9, 1960

2,948,155

STABILIZING GYRO

John E. Burkam, Rutledge, Pa., assignor to Altoscan Company, Lansdowne, Pa., a corporation of Pennsylvania Filed July 17, 1956, Ser. No. 598,458

8 Claims. (Cl. 74—5.6)

This invention relates to stabilizing apparatus for aircraft and other airborne devices, as well as for surface and sub-surface vehicles and vessels and for other moving objects. It is more particularly concerned with an instrument incorporating a gyroscope-like device and capable of providing, for one as well as for each of two or more planes of motion, a single combined signal, preferably in electrical form, proportional both to rate of motion and displacement in such plane, and without the use of differentiating or integrating means.

Stabilizing apparatus utilizing ordinary gyroscopic means in conventional gimbal ring mountings encounters considerable difficulty due to the undesirable effects of friction in the gimbal ring bearings. The gimbal ring bearings in such mounting do not rotate with the gyroscope wheel. When the supporting structure is tilted the friction in the gimbal bearings exerts a moment on the gyro wheel in the same direction as the structure is tilted, and the resulting gyroscopic precession then tilts the wheel at right angles to the tilt of the frame. Since this right angle precession is highly undesirable, gimbal bearing friction must be kept to an absolute minimum.

The present invention represents a substantial improvement over the ordinary gyroscopic stabilizer in eliminating completely the undesirable consequences of bearing friction. The instrument contemplated herein utilizes a gyro wheel or disk and a universal mounting therefor wherein the bearing or bearings rotate with the wheel. When the gyro wheel is spun at high speed and the supporting or reference structure is tilted the friction in the bearings always exerts a moment on the wheel only at right angles to the direction of tilt, as mathematical analysis will show, and the resulting gyroscopic precession then causes the wheel to tilt in the same direction as the reference structure. The direct following characteristic of the wheel thus achieved is an important feature of the invention.

It is another important objective of this invention to obtain directly, through further utilization of the favorable bearing friction effects, signals proportional to both rate and displacement, and to select and control such friction so that the proportions of rate and displacement components in the signals can be chosen and varied, making the instrument readily adaptable to a wide variety of applications in which stability characteristics and requirements differ.

A further specific objective of the invention is the provision of a simplified, low cost, light weight instrument for the dynamic stabilization of aircraft about any two mutually perpendicular axes of motion. Substitution of a single such inventive instrument for two conventional integrating rate gyros in an automatic pilot installation is a corollary objective hereof.

Still further objectives and advantages of the invention include the provision of an instrument capable of producing signals with power output high enough for direct application to relays in servo control circuits without intervening amplification thereof, and signals which are independent of each other for each axis of motion so that signals for one axis will not be cross-coupled into the controls for the other axis and so that the sensitivity of each control can be adjusted separately.

These and other objectives and advantages of the invention will become apparent from a reading of the following description and reference to the accompanying drawings, in which:

Figure 1 is a plan view of an instrument constructed in accordance with the invention;

Figure 2 is an elevational section view of the instrument taken along line 2—2 of Figure 1;

Figures 6 and 7 are representations in the form of vector diagrams, of the behavior of the inventive instrument when applied to a dynamically unstable craft, the effect of varying the amount of friction and damping in the rotor mount bearings being shown by a comparison of Figure 6, where the friction and damping is relatively low, with Figure 7, where the friction and damping is relatively high;

Figure 9:
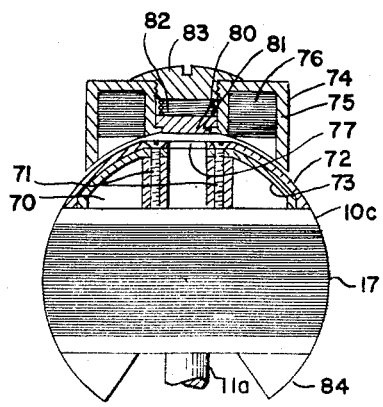
Figure 10:
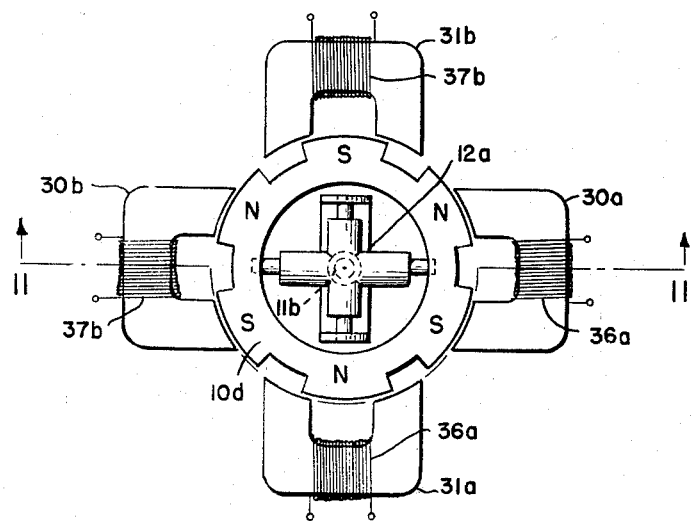
Figure 11:
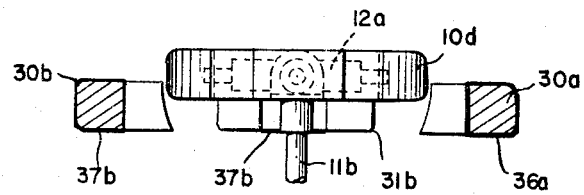

Figure 9 is an elevational section view of a modified form of balance wheel for the inventive instrument and a controllable damping device therefor; and Figures 10 and 11 are plan and elevational section views respectively, partly diagrammatic, of a modification of the inventive instrument utilizing a permanent magnet rotor and pickoff combination to generate required power, the Figure 11 view being taken along line 11—11 of Figure 10.

Without limitation thereof, an embodiment of the invention suitable for installation in an aircraft to achieve dynamic stability about the pitch and roll axes thereof is chosen here to illustrate its construction, application and operation. Referring to the drawings, balance wheel or rotor 10 is assembled to rotative drive shaft 11 by means of a universal joint 12 comprising a ball 13 fixed to shaft 11 and socket 14, rotor 10 being fabricated of lightweight material such as a suitable aluminum alloy in two separate halves 10a and 10b and fastened together about socket 14 by means of machine screws 15. Countersunk holes 16a and 16b, having a diameter substantially greater than the diameter of shaft 11, are provided through the central portions of rotor halves 10a and 10b so as to permit oscillatory movements of rotor 10 in any direction with respect to shaft 11 as it spins. The periphery of rotor 10 as so fabricated is spherically shaped and is made up of highly permeable steel ring laminations 17. Shaft 11 is drilled and grooved to provide passageway 18 for the feeding of a selected lubricant to ball 13 and thence through hole 18a therethrough to the bearing surfaces of joint 12.

Stop assembly 20 is fixedly mounted concentrically of shaft 11 by means of nut 21 and retainer ring 22 so as to rotate with the shaft and provide limits to oscillatory movements of rotor 10 such as will act to exert a moment on the rotor in a direction facilitating rapid restoration of the rotor to normal operation rather than conflicting therewith, as will be explained in more detail hereinafter. Stop assembly 20 comprises a disk divided into a plurality of equally spaced radially extending finger springs 23 of equal length and suitable stiffness, and uniformly oriented toward the rotor so as to severally bear against the periphery thereof as the rotor reaches the limit of oscillatory movement afforded thereby. The outer edge 24 of rotor half 10a may be beveled or chamfered to form a suitable surface for finger springs 23 to act against.

Figure 3:
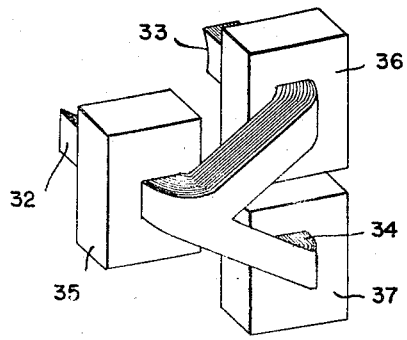
Figure 3 is a detail perspective view of the form of electrical pickoff used in the instrument of Figures 1 and 2.

Rotor shaft 11 is assembled to flanged collar 25 by means of bearings 26, shoulder 41, and beveled lock nut 42 and washer 43 assembly, so as to be free to rotate with respect thereto, washer 43 having an outer ear 44 bent into slot 45 in lock nut 42 and an inner ear 46 riding in slot 47 in shaft 11, and mounting plate 27 is concentrically affixed to collar 25 by means of screws 28. Electric motor drive means, not shown, may be connected with rotor shaft 11 in any convenient manner, as, for instance, insertion of a motor shaft having non-round cross-section into mating recess 29 in rotor shaft 11, for rotating the shaft and spinning the rotor wheel at high speed, minimum damping in the ball and socket universal joint being sufficient to transmit desired motion to the wheel. Variable reluctance pickoffs 30 and 31 are stationarily affixed to mounting plate 27, at locations respectively ninety degrees apart from each other about the periphery of rotor 10, each being positioned in close proximity to the spherical surface thereof. Each such pickoff is identical to the other and, as best shown in the detail view of Figure 3, has a composite laminated core, with three arms 32, 33 and 34, formed in a modified E—configuration of highly permeable steel. The central arm 32 is wound with a coil of wire to form primary winding 35, arms 33 and 34 each also being wound with a coil of wire to form secondary windings 36 and 37. The pole face of each arm is spherically concaved to permit juxtapositioning thereof with respect to the spherically convex periphery of rotor 10 with uniform and minimum airgap therebetween. Each pickoff takes a position at the rotor periphery so that arm 34 is vertically directly under arm 33 and so that arms 33 and 34 are ninety degrees from the axis to motion about which such pickoff is responsive. Pickoffs 30 and 31 are thus positioned relative to each other so that arms 33 and 34 of one of the pickoffs are ninety degrees from arms 33 and 34 of the other, for control of motion about the selected two mutually perpendicular axes. As is evident from the foregoing the rim of rotor wheel 10 with its structure of highly permeable steel ring laminations 17 together with each pickoff as so constructed and positioned completes a primary and two secondary magnetic circuits.

Figure 4:
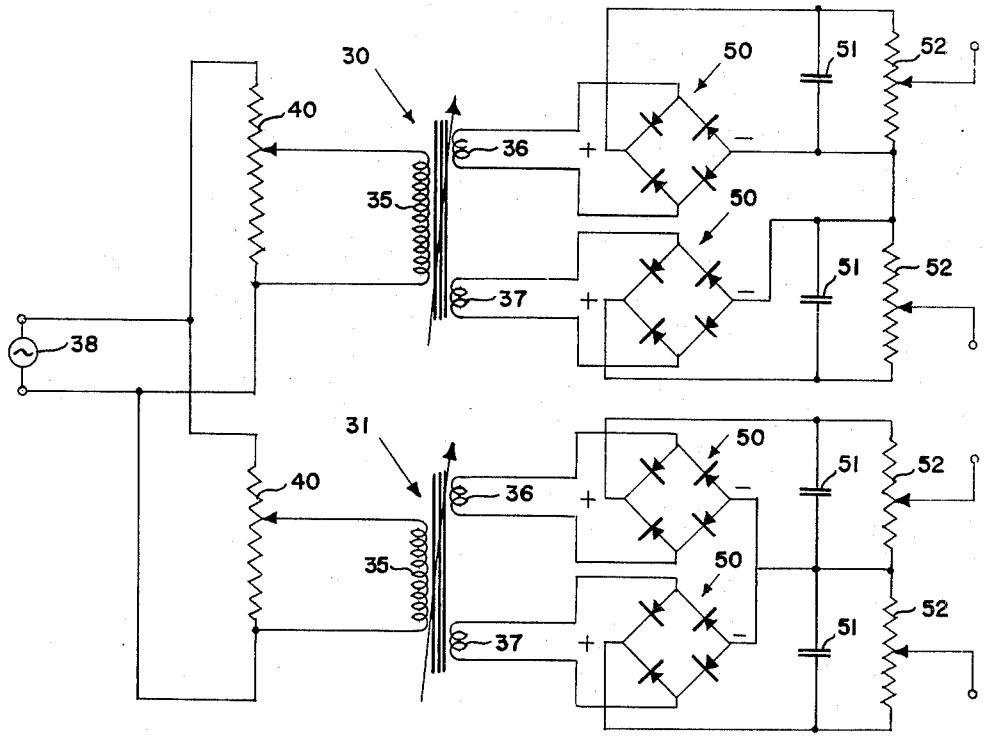
Figure 4 is a schematic diagram of the electrical circuit utilized in the instrument to achieve direct current output signals from alternating current input.

Each primary winding 35 is connected with an alternating current supply source 38, as shown in Figure 4, through a potentiometer 40. The resulting magnetic flux flows through the pickoff core and through secondary windings 36 and 37 in proportion to the respective susceptances of the two branches of the magnetic circuit formed by arms 33 and 34 and completed by the rim of rotor wheel 10. Secondary windings 36 and 37 are connected to each other so that the voltages thus induced in the respective secondary windings are 180 degrees out of phase with each other. Arms 33 and 34 are so positioned with respect to rotor 10 that the susceptances of the two branches of the magnetic circuit so formed are equal when the rotor's plane of rotation is perpendicular to shaft 11, the voltages then induced in the two secondary windings being equal and cancelling each other. As the shaft tilts with respect to the plane of rotation of the rotor, the rim of the rotor moves toward arm 33 or arm 34 and away from the other increasing the susceptance of the branch including the arm toward which the rim moves and decreasing the susceptance of the other branch, the induced voltages in the respective windings 36 and 37 varying directly with the susceptances in their respective branches. There will then be a resultant total voltage equal to the difference between the two winding voltages and in phase with the larger of the two, constituting the desired signal which is proportional to the angle between the plane of rotation of the rotor and the plane perpendicular to the shaft. If desired, direct current signal voltages may be obtained, as shown in Figure 4, by connecting the outputs of secondary windings 36 and 37 through separate full wave bridge-type rectifiers 50 and filter circuits comprising electrolytic capacitors 51 and resistors 52. Resistors 52 may be made variable as shown in Figure 4 to permit selective individual adjustment of output or sensitivity of the signals without changing input, as well as individual adjustment of null signal to zero.

If an alternating current supply source is not available for primary windings 35, they may be direct-current excited and notches may be cut in the rim of rotor wheel 10. The magnetic flux will then vary with azimuth angle of the rotor wheel and alternating current voltages will be induced in the secondary windings 36 and 37.

In the foregoing manner, either A.C. or D.C. signal voltages may be obtained from either A.C. or D.C. supply source, as suitable for any particular installation.

As shown in Figures 1 and 2, mounting plate 27 may be made large enough for mounting thereon potentiometers 40, and the rectifier circuit components including capacitors 51, etc., and dome shaped housing 60 may be fastened to mounting plate 27 to complete a compact enclosed instrument assembly.

The following explanation of the application and operation of the instrument as above described will serve further to clarify its features and advantages. The application contemplated herein is for dynamic stabilization of an aircraft about its pitch and roll axes. Accordingly the instrument is affixed to the structure of the aircraft with its rotor shaft normal to the pitch and roll axes and so oriented that arms 33 and 34 of pickoff 30 are in line with or parallel to the pitch axis and arms 33 and 34 of pickoff 31 are in line with or parallel to the roll axis. Thus pickoff 30 will be responsive to motion of the aircraft about its roll axis and pickoff 31 will be responsive to motion about the pitch axis.

Figure 8:
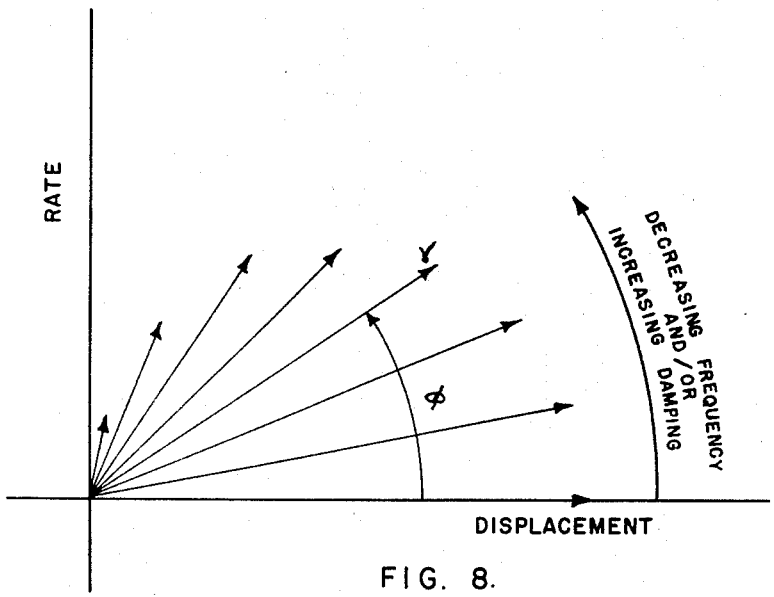
Figure 8 is a graphic representation of the phase relation between the instrument output signal and the angular displacement of the craft to which it is applied, indicating the varying proportions of rate to displacement components in the signal with varying amounts of damping.
Figure 5:
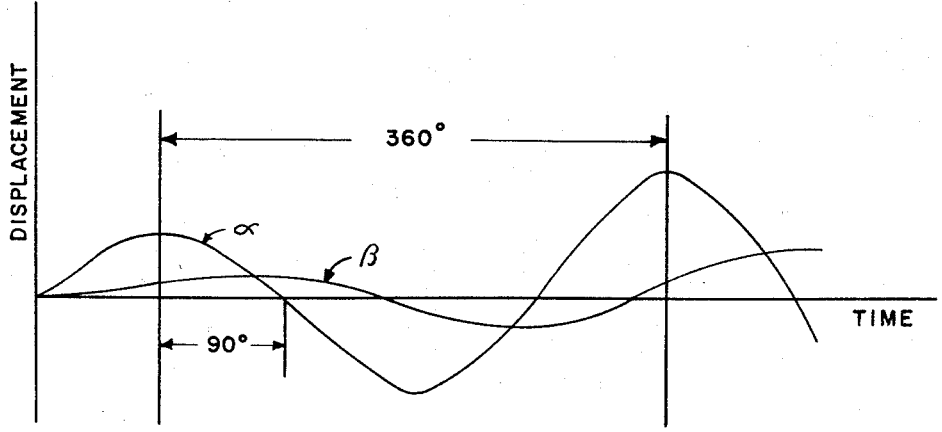
Figure 5 is a graphic representation of the behavior of the inventive instrument when applied to a dynamically unstable craft, comparing the oscillatory movements of the craft and the instrument rotor.

Considering now motion of the aircraft about its pitch axis and the response of pickoff 31 thereto, and assuming dynamic instability about the pitch axis, the aircraft will oscillate at some frequency in ever increasing amplitude. In Figure 5 the curve $\alpha$ represents the tilting of the aircraft with respect to the horizon. The rotor wheel 10 always seeks to rotate in a plane perpendicular to the rotor shaft 11 and hence will seek to have the same tilt as the aircraft in this installation. Its oscillatory movements with respect to the horizon are represented by the curve $\beta$ in Figure 5, as the rotor attempts to follow the aircraft. When $\alpha$ is greater than $\beta$, then $\beta$ is increasing, and conversely. The amount of rotor tilt with respect to the aircraft and hence with respect to the plane perpendicular to the rotor shaft will be the difference between the two quantities plotted in Figure 5. This difference may be most clearly shown by showing the tilt angles as rotating vectors, as in Figure 6, where the projections of the vectors on the horizontal represent their instantaneous values. The aircraft tilt angle $\alpha$ with respect to the horizon is taken as the reference vector and is placed horizontally in Figure 6. Since, in the case illustrated in Figure 5, $\beta$ reaches its maximum slightly less than ninety degrees of the cycle after $\alpha$ reaches its maximum, $\overline{\beta}$ lags $\overline{\alpha}$ by almost ninety degrees. Vector subtraction, $\overline{\alpha}-\overline{\beta}$, gives the vector $\overline{\gamma}$, which is the angle between the rotor plane of rotation and the plane perpendicular to the rotor shaft. It is seen that $\overline{\gamma}$ leads $\overline{\alpha}$ by a considerable phase angle, $\varphi$. The less the friction and damping in the rotor bearing or the higher the frequency of aircraft oscillation the smaller will be the wheel tilt $\beta$ with respect to the horizon and the nearer to ninety degrees will be the lag angle between $\beta$ and $\alpha$. In Figure 6 this would result in $\gamma$ being closer to $\alpha$ in phase and nearly equal to $\alpha$ in instantaneous value. Since, as already observed the signal output from pickoff 31 is proportional to the instantaneous value of $\gamma$ or its projection on the horizontal, the signal becomes nearly proportional to displacement $\alpha$ of the aircraft with respect to the horizon. On the other hand, the higher the friction and damping in the rotor bearing or the lower the frequency of aircraft oscillation the more accurately will the rotor follow the motion of the aircraft and the less will be the phase angle lag. Figure 7 depicts vectorially the situation for high bearing friction and damping or low frequency. The amplitude of $\gamma$ is smaller but its phase lead $\varphi$ is nearly ninety degrees. Thus the signal, being a maximum when $\alpha$ is nearly a minimum and conversely, becomes nearly proportional to the rate of change of angular displacement $\alpha$ of the aircraft with respect to the horizon. In practice, the friction and damping in the rotor bearing 12 may be adjusted to suit the natural frequency of the aircraft to obtain the best compromise between a rate and displacement signal for optimum stabilization of the aircraft. The diagram of Figure 8 shows the effect of increasing damping or decreasing frequency on the strength of the signal output $\gamma$, its phase relation $\varphi$ to angular displacement $\alpha$ of the aircraft and the proportion of rate and displacement components therein. The vertical and horizontal components of each signal vector $\gamma$ are the rate and displacement components thereof respectively.

While the foregoing analysis has been made with respect to motion about the pitch axis only and the response of the corresponding pickoff 31 thereto it is equally applicable to performance of the instrument with respect to motion about the roll axis and the response of the corresponding pickoff 30 thereto. Each of the electrical signals so produced, being proportional partly to angle of tilt and partly to rate of tilt, is fed into the control system of the aircraft so that the control deflection is proportional to the amplitude of the signal and in the direction to oppose the angle and rate of tilt. As is well known, the rate component of the signal is required for dynamic stabilization, because in order to damp out an oscillation energy must be absorbed from the motion. A force opposing the velocity will absorb that energy and that force is supplied by the controls deflecting in response to the rate component of the signal. Since the instrument furnishes two separate signals for the pitch and roll angular directions, the sensitivity of each control can be adjusted separately.

Similarly, the unit can be used to stabilize any two mutually perpendicular motions of the aircraft, since it is not sensitive to gravity and may be mounted in any position. For example, a fighter airplane may need stabilization in pitch and yaw. The rotor shaft 11 could be mounted parallel to the longitudinal axis of the aircraft and the damping would then be set at a fairly high value to accommodate the high natural frequency and rapid motions of the fighter. The sensitivity in the two selected directions of control can, as noted, be varied individually to suit the aircraft.

Further explaining the functioning of stop assembly 20, as shown in Figures 1 and 2, and referred to above, when the rotor 10 tilts with respect to shaft 11 to such a degree as to bring its beveled outer edge 24 into contact with one of the finger springs 23, a moment corresponding in direction to the moment exerted by the bearing friction when the shaft is tilted reinforces such bearing friction moment and causes the rotor to more quickly follow the shaft tilt, restoring it quickly to operative status without creation of undesirable precession consequences.

Electromagnetic damping, through the use of magnetic clutch or eddy current dampers for instance, will permit in-flight adjustment of the rotor following rate from the cockpit for desired performance. Flying characteristics can thus be adjusted to suit the pilot or the conditions of flight, such as pilot training, long cross country flights or rapid maneuvers. Figure 9 shows a modication suitable for accomplishing such controllable damping, in which rotor 10c, mounted on shaft 11a, incorporates an upper spherical portion 70 which may be affixed thereto by screws 71. Spherical portion 70 includes an aluminum shell 72 with a permeable steel inner lining 73 fitted thereto. Stationarily affixed over rotor 10c is cup magnet 74 having a soft steel shell 75 and inner winding 76. Magnetizing current flows through winding 76. Spherical portion 70 is provided with flat surface 77 which is exposed to the center pole of cup magnet 74 when the rotor's plane of rotation is perpendicular to the shaft, leaving a large air gap and a minimum amount of magnetic flux circulating through the steel lining of the rotor's upper spherical portion 70. When the shaft is tilted the magnet's center pole moves to one side of the flat surface 77, bringing the steel lining closer to the center pole and causing more magnetic flux lines to link the center pole with the magnet shell 75 through the steel lining. The aluminum shell 72 passes through this increased magnetic field, generating current in itself. This current produces heat in the aluminum shell and reacts against the magnetic field. The resistance to motion of the aluminum shell will be tangent to the rotor and opposite to its direction of rotation, and is proportional in amount to the peripheral speed of the aluminum shell and to the strength of the magnetic field. The resistance causes a moment in the rotor which can be resolved into a component perpendicular to the spin axis of the shaft and a component perpendicular to the tilt axis of the shaft. Gyroscopic precession of the rotor due to the latter component of the moment then takes place to bring the rotor plane of rotation perpendicular to the shaft. Control of the magnetizing current is thus seen to provide control of the magnitude of this damping effect. Friction button 80 may be substituted in this modification for stop assembly 20. This button, preferably of formica or oilite bronze, is held against shoulder 81 by spring 82 and cap screw 83. During excessive tilt the spherical surface of upper portion 72 of the rotor comes in sliding contact with the friction button 80. The resulting friction reinforces the resistive force caused by the eddy currents and assists in restoring the rotor to its normal operating condition without precessing the rotor out of the plane of motion of the shaft tilt. Counterbalancing weight extension 84 is added to the lower portion of the rotor to compensate for the added weight of upper portion 72 and maintain the rotor in proper balance with its center of gravity at the center of ball 13 in the ball and socket mounting joint. It is to be noted that a minimum amount of damping in the ball and socket mounting is sufficient to drive the rotor against windage and pickup reaction in the embodiment of Figures 1 and 2 as well as against the added drag of the eddy current damper modification of Figure 9.

As has been noted, the inventive instrument has no vertical sense, and no matter what position the aircraft is held in, the rotor will soon become perpendicular to its shaft. The addition of an electric pendulum which gives a signal proportional to pendulum displacement in the pitch and roll directions will provide vertical sense as desired.

Since the energy for the pickoff signals is obtained from the source of power supplying the primary windings and the resulting net precessing moment on the rotor can by careful design and manufacture be made equal to zero, the level of power output can be made high enough to operate a relay in the control circuit directly without amplification. The variable reluctance pickoff is thus particularly well suited to use in the inventive instrument, the magnetic attractive force exerted thereby on the rotor merely being a radial force which adds to the bearing friction in effect, being beneficial in such application but not tolerable with respect to ordinary gyroscopes. If by reason of manufacturing tolerances or simplification of design the precessing moment on the rotor is not zero, its magnitude in comparison to the bearing friction is small enough to be of negligible effect on the operation of the inventive instrument.

The modification of Figures 10 and 11 illustrates an embodiment of the invention which eliminates the separate power source and the primary windings in the pickoffs. Here the rotor wheel 10d comprises a multiple-pole permanent magnet and pickoffs 30a, 30b, 31a and 31b include permeable material cores and single output windings 36a and 37b thereabout. A modified Hooke's type of universal joint 12a as illustratively shown in Figures 10 and 11 assembles the rotor 10d to shaft 11b to provide a more positive drive than in the ball and socket type of universal joint utilized in the embodiment of Figures 1 and 2, although other well known forms of constant velocity positive drive universal joints may be also adapted for such purpose. C-type pickoff pairs 30a and 30b, and 31a and 31b, may be used in this modification, each pickoff being stationarily juxtapositioned with respect to the rotor wheel as shown in Figures 10 and 11, pickoff pair 30a and 30b being situated diametrically opposite each other on a diameter normal to the axis to motion about which they are responsive, and pickoff pair 31a and 31b being respectively situated ninety degrees apart from pickoff pair 30a and 30b and similarly opposite each other on a diameter normal to the axis of motion about which they are responsive. As shown in Figure 11, the pickoffs are positioned in a plane parallel to but below the plane of the rotor. As the rotor spins it generates voltages in the pickoff windings, and as the rotor oscillates its rim moves nearer to one pickoff, as for instance 30a, and farther from the other one of the pair 30b. The voltage thus induced in coil 36a of pickoff 30a then increases and the voltage induced in coil 37b of pickoff 30b decreases, the difference therebetween constituting the desired signal for motion about the particular axis, as before. Motion about the other axis similarly generates a signal constituting the difference in voltages induced in coils 36a and 37b of pickoff pair 31a and 31b. The signals thus generated may be applied as in the embodiment of Figures 1 and 2, as heretofore explained.

The great versatility and simplicity of the inventive instrument now becomes more evident. While, illustratively, its construction and application for use in aircraft to stabilize motion about any two mutually perpendicular axes has been shown, it is apparent that it can be readily adapted for dynamic stabilization of motions of any moving object about any single axis when but one pickoff is used (or pickoff pair), or about any two axes whether or not mutually perpendicular when two pickoffs are used and depending on their relative angular positions, or even about more than two axes, if all are in the same plane with the addition of a separate pickoff and appropriate positioning thereof for each additional axis about which motion is to be controlled. Inclusion of a vertical sense pendulum will increase the versatility of the instrument as noted. Other variations, adaptations, and applications, utilizing different types, forms and arrangements of rotor, universal mounting and drive means therefor, bearing friction and damping control, pickoffs, connecting circuits, etc., are equally within the spirit and scope of the invention as thus described and the appended claims.

Having thus described and illustrated my invention, I claim:

1. An instrument for dynamically stabilizing an aircraft in two planes of motion respectively perpendicular to each other, having a mounting plate affixed to the aircraft in a third plane perpendicular to each of said two planes of motion, a shaft rotatively assembled thereto and extending normally thereof, drive means connected to said shaft, a balance wheel, and a ball and socket joint having a selected frictional and damping characteristic concentrically assembling and coupling said wheel to said shaft, said wheel having a hole centrally thereof selectably larger than the diameter of the shaft so as to permit oscillation of the wheel in any direction relative to the shaft, said wheel having a rim of spherically convex contour and built up of a plurality of highly permeable steel rings, a pair of composite modified E-configuration variable reluctance electrical pickoffs affixed to said mounting plate, each such pickoff having a core built up of highly permeable steel laminations and having a central arm and two adjacent arms, a primary winding about said central arm and a secondary winding about each of said adjacent arms, the pole face of each of the arms being spherically concaved and juxtapositioned with respect to said wheel rim for uniform and minimum airgap therebetween, each pickoff being positioned so that its two adjacent arms are in the plane to motion within which it is responsive and so that tilting of the balance wheel relative to the aircraft in such plane of motion will increase the susceptance of the magnetic path including the balance wheel rim and the adjacent arm toward which it moves while reducing the susceptance of the magnetic path including the other one of said adjacent arms, a source of power and the primary winding of each pickoff being connected thereto, and the outputs of the two secondary windings in each pickoff being connected together so as to oppose each other in phase.

2. The instrument of claim 1 including a stop assembly, and a nut and retainer ring concentrically mounting said stop assembly to said shaft in selected spaced relationship with said balance wheel so as to rotate with said shaft, said stop assembly comprising a disc divided into a plurality of equally spaced radially extending finger springs equal in length to each other and uniformly oriented toward the balance wheel so as to severally bear against the periphery thereof when the balance wheel reaches the limit of oscillatory movement with respect to the shaft afforded thereby.

3. In a gyroscopic device having a rotative shaft and a rotor mounted thereon so as to be free to oscillate in any direction relative thereto, a stop assembly mounted to said shaft in spaced relationship to said rotor and having a plurality of radially extending finger springs spaced circumferentially of each other and positioned so as to severally provide limits of oscillatory movement of the rotor in the several directions relative to the shaft by bearing against the periphery of the rotor.

4. In a stabilizing device having a shaft and a rotor universally mounted thereon, adjustable damping means for controlling the oscillation of the rotor with respect to the shaft including an upper spherical portion attached to the rotor having an outer nonferrous metal shell and an inner magnetically permeable lining and a flat top surface, and a cup shaped electromagnet with an external shell core and an internal winding with a magnetizing current flowing therethrough stationarily positioned over the upper spherical portion of the rotor so that its center pole is directly over the flat top surface of said upper spherical portion of the rotor when the rotor plane of rotation is normal to the shaft and so that as the rotor oscillates with respect to the shaft the magnetic flux through the magnetic circuit completed by the electromagnet core and the inner lining of the upper spherical portion of the rotor increases producing eddy currents in the outer shell and a force opposing said oscillation, said force being adjustable in amount by adjusting the amount of the magnetizing current.

5. In the stabilizing device of claim 4 a friction button installed centrally of said cup shaped electromagnet and having a flat bottom surface clearing the flat top surface of the upper spherical portion of the rotor and positioned so as to bear against the spherical surface thereof when the rotor oscillates excessively with respect to the shaft thereby providing a limit to the extent of such oscillation.

6. In a stabilizing device, a shaft, a rotatable rotor so mounted on said shaft as to be free to oscillate with respect thereto and having a direct following characteristic so that in whatever direction the shaft is tilted the rotor will always seek to rotate in a plane perpendicular to the shaft, damping means controllably precessing said rotor in the direction of shaft tilt, and a stop assembly limiting the amount of oscillation of the rotor with respect to the shaft and operative to precess said rotor in the direction of shaft tilt.

7. An instrument for dynamically stabilizing an aircraft about two mutually perpendicular axes of motion, having a shaft rotatively mounted with respect to the aircraft and extending normally of said axes of motion, a rotor universally mounted to said shaft and comprising a multiple pole permanent magnet, and two pairs of variable reluctance pickoffs responsive respectively to motion about the two said mutually perpendicular axes, each pickoff having a C-shaped core made of magnetically permeable material and an output winding thereabout, all of said pickoffs being stationarily mounted with respect to the aircraft and positioned ninety degrees apart about the periphery of the rotor in close proximity therewith in a plane normal to the shaft, said plane being slightly spaced from the plane of the rotor and parallel thereto when the plane of the rotor is normal to the shaft, the pickoffs of each pair being situated on opposite sides of the rotor on the diameter normal to the one of the two mutually perpendicular axes to motion about which they are respectively responsive, the output winding of one pickoff in each pair being connected to the output winding of the other pickoff in such pair so that the outputs therefrom oppose each other in phase.

8. A stabilizing instrument having a shaft, a rotor having a top portion with a contoured surface, a universal joint assembly said rotor to said shaft, and a spring-loaded friction button positioned concentrically of the shaft axis over the contoured surface of the top portion of the rotor so as to have slight clearance therefrom when the rotor plane of rotation is normal to the shaft and so as to bear against said contoured surface with increasing pressure as the tilt of the rotor relative to the shaft increases.

References Cited in the file of this patent

UNITED STATES PATENTS

| | | |
|---|---|---|
| 1,860,230 | Brown | May 24, 1932 |
| 1,987,483 | McDonald | Jan. 8, 1935 |
| 2,412,584 | Grimshaw | Dec. 10, 1946 |
| 2,440,713 | Brown | May 4, 1948 |
| 2,734,384 | Stewart | Feb. 14, 1956 |
| 2,753,718 | Howe | July 10, 1956 |
| 2,815,584 | Watson | Dec. 10, 1956 |

FOREIGN PATENTS

| | | |
|---|---|---|
| 157,252 | Australia | June 25, 1954 |
| 1,090,872 | France | Oct. 20, 1954 |